US009815355B2

(12) United States Patent
Byrne et al.

(10) Patent No.: US 9,815,355 B2
(45) Date of Patent: Nov. 14, 2017

(54) CANOPY ASSEMBLY (71) Applicant: RADIO FLYER INC., Chicago, IL (US)

(72) Inventors: Emily Byrne, Chicago, IL (US); Michelle Warner, Portland, OR (US)

(73) Assignee: Radio Flyer Inc., Chicago, IL (US)

( * ) Notice: Subject to any disclaimer, the term of this patent is extended or adjusted under 35 U.S.C. 154(b) by 102 days.

(21) Appl. No.: 14/753,526

(22) Filed: Jun. 29, 2015

(65) Prior Publication Data

US 2016/0375749 A1  Dec. 29, 2016

(51) Int. Cl.
*B60J 7/10* (2006.01)

(52) U.S. Cl.
CPC ............... *B60J 7/102* (2013.01); *B60J 7/106* (2013.01)

(58) Field of Classification Search
CPC ....................................................... B60J 7/102
USPC ........... 296/102, 163, 177; 135/88.01, 88.07, 135/88.09, 96, 117, 119; 403/300, 302, 403/321, 322.2, 332, 336, 361
See application file for complete search history.

(56) References Cited

U.S. PATENT DOCUMENTS

| 579,373 | A | 3/1897 | Wolbrecht |
| 1,734,170 | A | 11/1929 | Leffert |
| 2,385,716 | A | 9/1945 | Mahaffey |
| 2,714,387 | A | 8/1955 | Meldrum |
| 2,777,454 | A | 1/1957 | Kramer |
| 3,593,997 | A | 7/1971 | Boehner |
| 4,083,601 | A | 4/1978 | McBeth |
| 4,815,784 | A * | 3/1989 | Zheng ............... B60J 1/2091 160/329 |
| 4,926,893 | A | 5/1990 | Klopfenstein |
| 5,041,043 | A | 8/1991 | Hoke |
| 5,232,005 | A | 8/1993 | Mitchell |
| 5,331,993 | A | 7/1994 | Billbury |
| D357,050 | S | 4/1995 | McClain |
| 5,403,239 | A | 4/1995 | Zimmers |
| 5,560,383 | A | 10/1996 | Fuller |
| 5,809,700 | A | 9/1998 | Roush |
| 5,842,732 | A | 12/1998 | Daggett et al. |
| 6,250,320 | B1 | 6/2001 | Roth |
| 6,260,566 | B1 * | 7/2001 | LaFave ............... B62K 9/00 135/88.01 |
| 6,263,893 | B1 | 7/2001 | Spinella et al. |
| 6,446,981 | B1 | 9/2002 | Wise et al. |

(Continued)

OTHER PUBLICATIONS

Radio Flyer Canopy Assembly Instructions, at least as early as Jun. 29, 2015.

(Continued)

*Primary Examiner* — H Gutman
(74) *Attorney, Agent, or Firm* — McDermott Will & Emery LLP (57) ABSTRACT

A canopy assembly for a ride-on vehicle includes a canopy having a plurality of receivers positioned on a bottom surface of the canopy, and a plurality of canopy supports that matches in number that of the plurality of receivers. Each of the plurality of canopy supports includes at a top a connector that is configured to securely engage one of the receivers. Additionally, each of the plurality of canopy supports includes a bottom end that is configured to securely fit within a receiving aperture formed in the body of the ride-on vehicle, thereby attaching the canopy assembly to the ride-on vehicle.

17 Claims, 6 Drawing Sheets (56) References Cited

U.S. PATENT DOCUMENTS

| | | | |
|---|---|---|---|
| 6,508,262 B1 | 1/2003 | Takayama | |
| 6,718,600 B1 | 4/2004 | Gillis | |
| D551,723 S * | 9/2007 | Schlegel | D21/425 |
| D551,724 S * | 9/2007 | Seckel | D21/425 |
| 7,493,908 B2 | 2/2009 | Carter et al. | |
| RE40,657 E | 3/2009 | Suh | |
| 7,628,369 B2 | 12/2009 | Chen | |
| 7,673,643 B2 | 3/2010 | Seo | |
| 7,699,091 B2 * | 4/2010 | Fisher, Sr. | E04F 10/02 |
| | | | 160/393 |
| 7,980,519 B2 | 7/2011 | Chen | |
| 8,011,686 B2 | 9/2011 | Chen et al. | |
| 8,220,824 B2 | 7/2012 | Chen et al. | |
| 8,342,544 B1 | 1/2013 | Blewett et al. | |
| 8,388,015 B2 * | 3/2013 | Chen | B62B 3/007 |
| | | | 280/642 |
| 8,439,426 B2 | 5/2013 | Dempsey | |
| 8,746,267 B2 | 6/2014 | Lovley, II | |
| 8,955,855 B2 * | 2/2015 | Herlitz | B62B 7/04 |
| | | | 280/32.5 |
| 9,022,413 B2 | 5/2015 | Liu | |
| D731,166 S * | 6/2015 | Ma | D3/5 |
| 9,056,621 B1 | 6/2015 | Jin | |
| 9,073,564 B2 | 7/2015 | Yang et al. | |
| 9,085,311 B1 | 7/2015 | Chen | |
| 9,145,154 B1 | 9/2015 | Horowitz | |
| 9,193,371 B2 | 11/2015 | Sherman | |
| 9,211,897 B2 | 12/2015 | Yang et al. | |
| 9,248,072 B2 | 2/2016 | Wu | |
| 9,376,133 B2 | 6/2016 | Sun | |
| 2002/0179134 A1 | 12/2002 | Suh | |
| 2006/0062632 A1 | 3/2006 | Jang | |
| 2006/0169311 A1 | 8/2006 | Hwang | |
| 2006/0254635 A1 | 11/2006 | Matheus | |
| 2007/0003361 A1 | 1/2007 | Wang | |
| 2007/0182198 A1 * | 8/2007 | Michelau | B62B 9/147 |
| | | | 296/100.06 |
| 2008/0011345 A1 * | 1/2008 | Mohns | A47C 7/66 |
| | | | 135/88.01 |
| 2009/0156094 A1 | 6/2009 | Seckel et al. | |
| 2009/0206211 A1 * | 8/2009 | Goodman | F16M 11/34 |
| | | | 248/150 |
| 2010/0090444 A1 | 4/2010 | Chen | |
| 2010/0156069 A1 | 6/2010 | Chen | |
| 2013/0015629 A1 | 1/2013 | Bengtzen | |
| 2014/0030012 A1 | 1/2014 | Lee | |
| 2014/0251394 A1 * | 9/2014 | Ma | A45B 25/10 |
| | | | 135/19.5 |
| 2015/0052662 A1 * | 2/2015 | Taylor | A45B 23/00 |
| | | | 2/209.11 |
| 2015/0083174 A1 | 3/2015 | Desyr | |
| 2015/0086290 A1 * | 3/2015 | Bisset | F16B 5/0266 |
| | | | 411/15 |
| 2015/0151771 A1 | 6/2015 | Jin | |
| 2015/0329135 A1 | 11/2015 | Sun | |
| 2016/0324324 A1 * | 11/2016 | Wilkerson Altonen | E04H 15/40 |

OTHER PUBLICATIONS

Radio Flyer Model# 3100/3175, Canopy Set Up Instructions, at least as early as Jun. 29, 2015.

* cited by examiner

CANOPY ASSEMBLY

FEDERALLY SPONSORED RESEARCH OR DEVELOPMENT

Not Applicable.

TECHNICAL FIELD

The present invention relates generally to ride on toys, and more specifically to a canopy assembly for a ride on toy, such as a wagon.

BACKGROUND

Typically, when riding in ride-on vehicles, such as wagons, children are exposed to weather elements, including the sun. It is commonly understood that young children can be easily harmed by sunburns and other damaging effects of the sun. As such, parents typically provide suitable clothing for their children, such as long sleeve shirts and hats, to minimize their exposure to the sun. However, in particularly hot and humid climates, long sleeve shirts and hats can be very uncomfortable, thereby triggering other health issues such as heat exhaustion. Parents also typically apply sunscreens on their children, which help to provide protection against the potentially harmful effects ultraviolet rays. Because parents know that the effectiveness of sunscreens does not last, they tend to reapply them on their children's skin on a regular basis. Unfortunately, sunscreens fail to provide sufficient skin protection when long periods of sun exposure are involved.

In order to overcome the above-discussed sun exposure issues when children are seated in standard wagons, canopies attachable to wagons were developed. Canopies on wagons also provide benefit should user's get caught in the rain unexpectedly. However, a wagon canopy is typically adapted to be attached to a canopy frame through a number of cross support members that are joined to each other and to a number of vertical support members. As such, this canopy does not collapse well for storage and transport. Additionally, other canopies require special attachment mechanisms to connect the canopy frame to the wagon body. Accordingly, there is a need for a canopy assembly that can be easily attached to and detached from a wagon, and which folds quickly and easily. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to one embodiment, the disclosed subject technology relates to a canopy assembly configured to be securely attached to a ride-on vehicle, such as a wagon. In one embodiment, a canopy assembly includes a canopy having a plurality of receivers, such as snap elements, positioned on a bottom surface of the canopy, and a plurality of canopy supports that matches in number that of the plurality of receivers. Each of the plurality of canopy supports includes at a top end a connector that is configured to securely engage one of the receivers. Moreover, each of the plurality of canopy supports includes a bottom end that is configured to securely fit within a receiving aperture formed in a body of the ride-on vehicle, thereby attaching the canopy assembly to the ride-on vehicle.

According to another embodiment, the disclosed subject technology relates to a canopy assembly for a ride-on vehicle comprising a canopy having a top surface, a bottom surface, and a plurality of receivers extending from the bottom surface of the canopy, and, a plurality of separate canopy supports, wherein each of the plurality of canopy supports has a top end and a bottom end, wherein each of the plurality of canopy supports has a connector at the top end thereof, the connectors being configured to be individually removably secured to the receivers of the canopy, and wherein each of the bottom ends of the canopy supports are configured to be individually connected to the ride-on vehicle. In another embodiment, each of the plurality of connectors has a supporting flange extending radially outwardly from the connector to support a portion of the canopy.

According to another embodiment, the disclosed subject technology relates to a canopy assembly for a ride-on vehicle comprising a canopy having a top surface and a bottom surface, a plurality of holders secured to the bottom surface of the canopy, a plurality of receivers, each of the receivers having a flange extending radially outwardly, each holder securing one of the receivers to the canopy via the flange of the receiver, and, a plurality of separate canopy supports, wherein each of the plurality of canopy supports has a connector at a top end thereof, the connectors being configured to be individually removably secured to the receivers of the canopy, each connector having a supporting flange extending radially outwardly from the connector to support a portion of the receiver.

According to another embodiment, the disclosed subject technology relates to a canopy assembly for a ride-on vehicle comprising a canopy having a top surface, a bottom surface, and a plurality of receivers extending from the bottom surface of the canopy, and, a plurality of separate canopy supports, wherein each of the plurality of canopy supports has a connector at a top end thereof, the connectors being configured to be individually removably secured to the receivers of the canopy, and wherein each of the plurality of canopy supports includes a bottom end that is configured to securely fit within a respective receiving aperture formed in the ride-on vehicle, the receiving apertures having an inner surface with a plurality of ribs extending inwardly therefrom to support the canopy support.

Additional features, advantages, and embodiments of the present disclosure may be set forth or apparent from consideration of the following attached detailed description and drawings. It is therefore understood that the subject technology is capable of other and different configurations and its several details are capable of modification in various other respects, all without departing from the scope of the subject technology. Moreover, it is to be understood that both the foregoing summary of the present disclosure and the following detailed description of figures are exemplary and intended to provide further explanation without limiting the scope of the present disclosure as claimed.

BRIEF DESCRIPTION OF THE DRAWINGS

To understand the present invention, it will now be described by way of example only, not by way of limitation, with reference to the accompanying drawings in which.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings of the disclosure.

Figure 1:
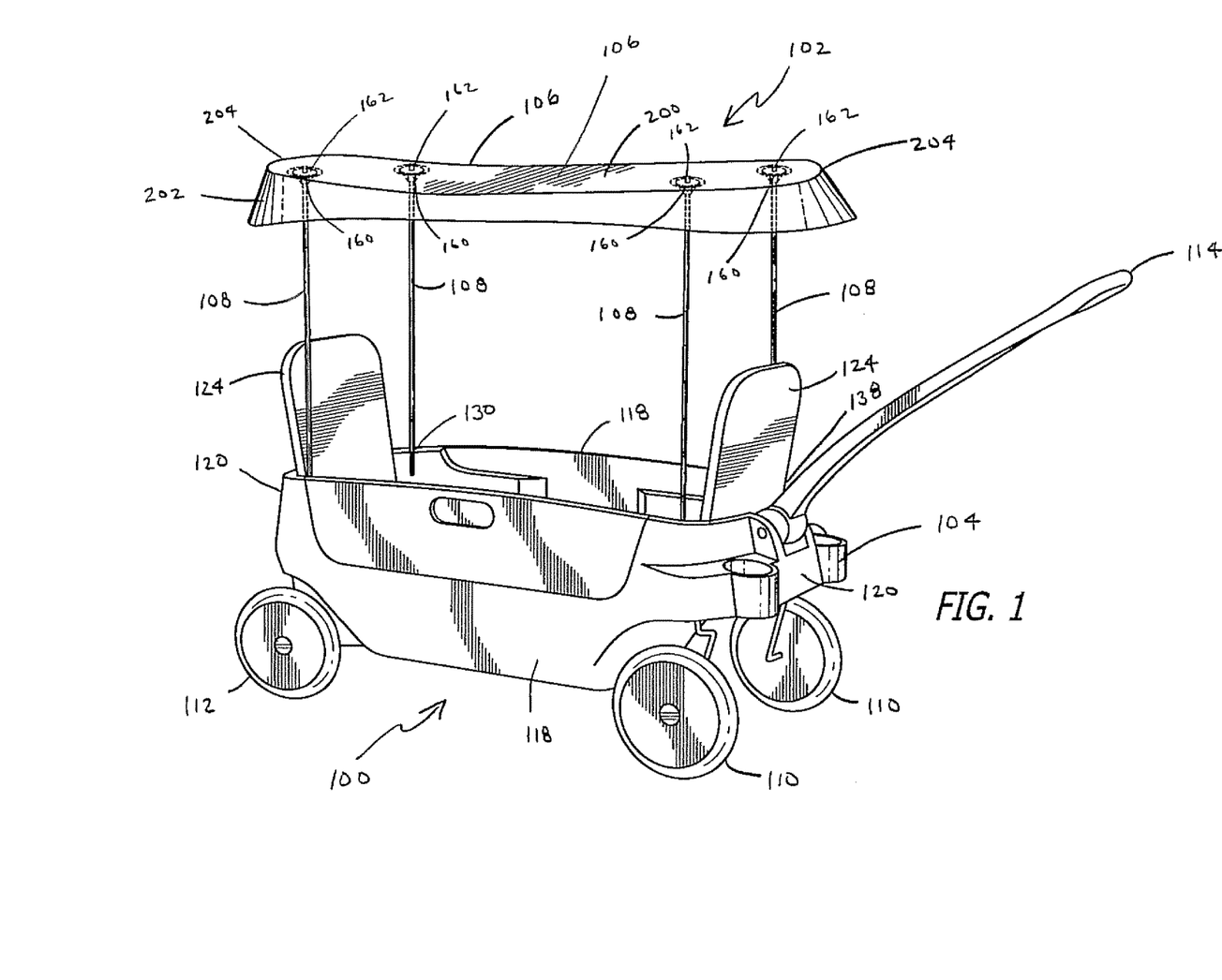
FIG. 1 is a perspective view of a wagon having one exemplary embodiment of a canopy assembly of the present disclosure.
Figure 2:
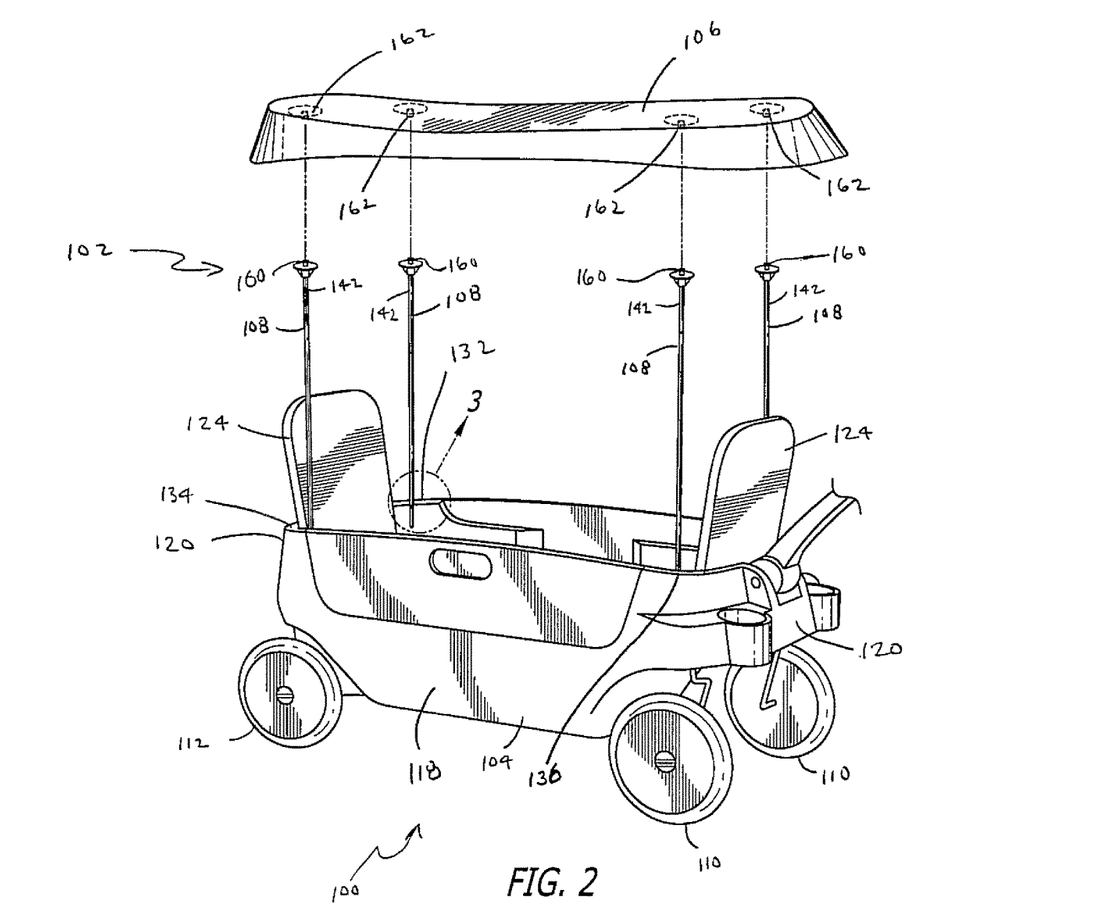
FIG. 2 is a perspective view of the wagon of FIG. 1 with the canopy detached from the canopy support.

Referring now to the figures, and specifically to FIGS. 1 and 2, there is shown one embodiment of a canopy assembly 102 for a ride-on vehicle 100, such as a wagon 100. The canopy assembly 102 can be easily secured to a wagon body 104 via canopy supports 108. Further, the canopy 106 of the canopy assembly 102 can be connected and removed from the canopy supports 108 as described herein. In a preferred embodiment, four canopy supports 108 are utilized to removably support the canopy 106 of the canopy assembly 102.

As shown in FIGS. 1 and 2, in one embodiment the ride-on vehicle 100 may have a body 104 made of molded hard plastic, metal or wood, that is mounted upon a pair of front wheels 110 and a pair of rear wheels 112. The front wheels 110 may be rotatably attached to the body 104 to allow for turning or steering of the ride-on vehicle 100. In one embodiment, a handle 114 is attached to the wagon body 104 to allow for a person to pull the wagon 100.

In one embodiment, the wagon body 104 includes a bottom wall 116, opposing side walls 118, and opposing end walls 120. Additionally, in another embodiment, the wagon body 104 may have seats 124 to allow children/toddlers to ride seated in the wagon body 104. In various embodiments, the seats 124 may include a seat portion and a backrest portion, however, the backrest portion may be omitted. Alternately, the backrest portion may be pivotable between a backrest position and a folded down position. Additionally, safety belts (not shown) fitted with an adjustment buckle may be attached to a respective seat for restraining a seated child.

As shown in FIGS. 1 and 2, in a preferred embodiment the canopy assembly 102 has four canopy supports 108. Preferably, each canopy support 108 is received and supported within a separate receiving aperture 130. The receiving apertures 130 for supporting the canopy supports 108 are preferably formed integrally in the four opposing corners 132, 134, 136, 138 of the wagon body 104.

Figure 3:
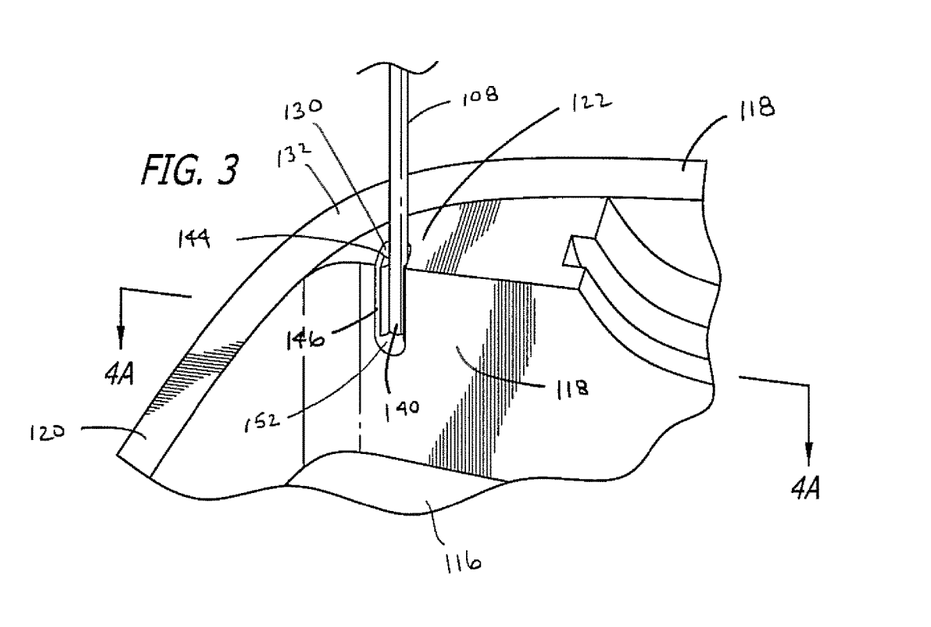
FIG. 3 is a partial perspective view of a canopy support for a canopy assembly inserted into a receiving aperture of the wagon body.
Figure 4A:
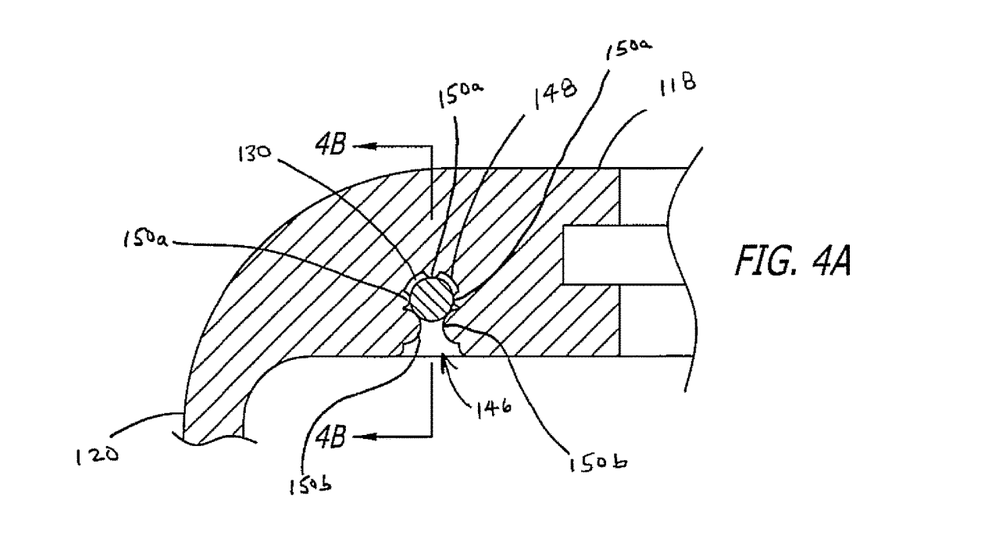
FIG. 4A is a partial cross-sectional view of the wagon body, receiving aperture and canopy support of FIG. 3 about line 4A-4A of FIG. 3.
Figure 4B:
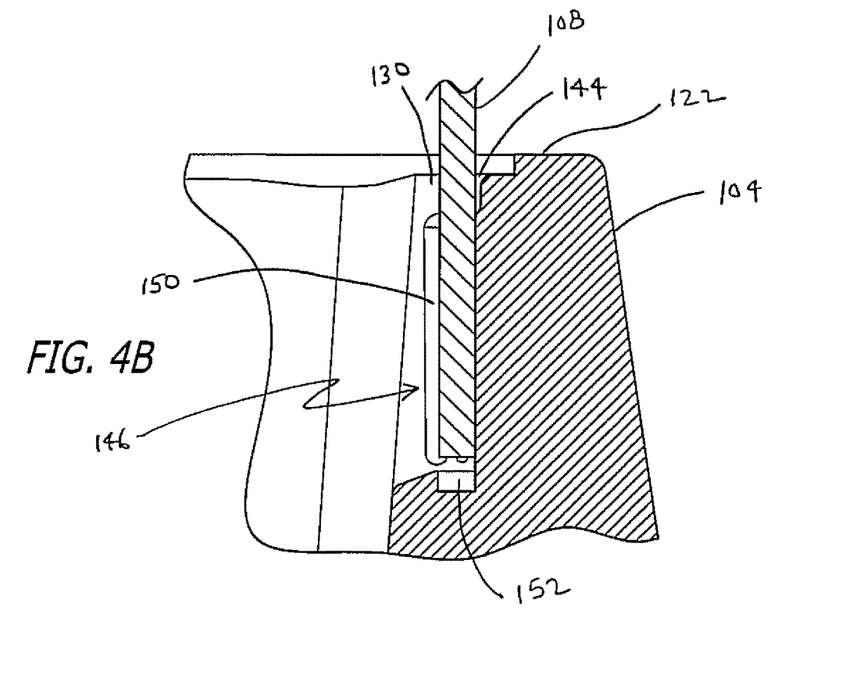
FIG. 4B is a partial cross-sectional view of the wagon body, receiving aperture and canopy support of FIG. 3 about line 4B-4B of FIG. 4A.
Figure 5:
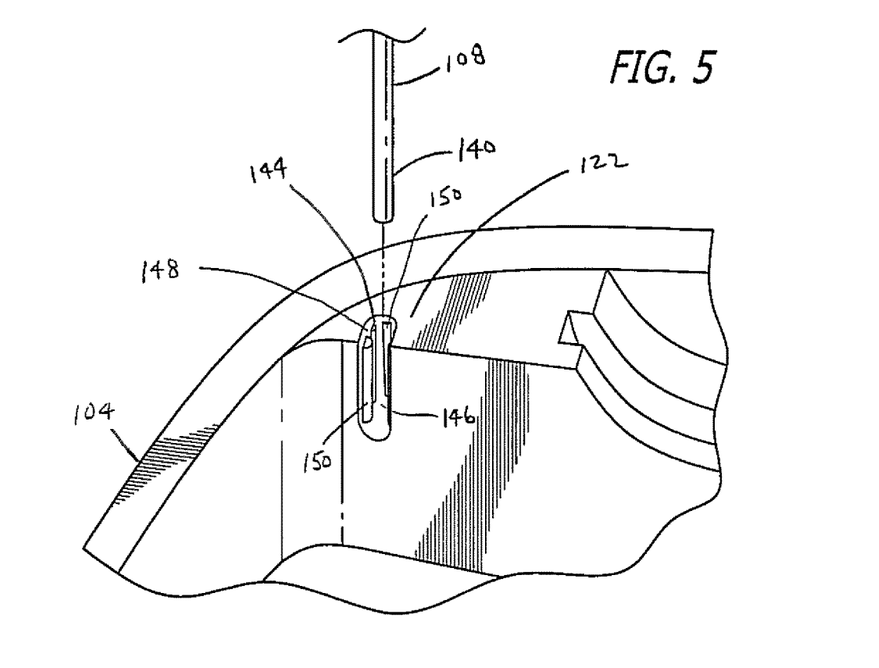
FIG. 5 is a partial perspective view of a canopy support for a canopy assembly removed from the receiving aperture of a wagon body.

As shown in FIGS. 3-5, each canopy support 108 can be securely affixed within a receiving aperture 130 without the use of clips or other fastening mechanisms, by slidingly pushing a bottom end 140 of the canopy support 108 into the respective receiving aperture 130, which receive and secure the canopy supports 108 in a pressure-fit manner. In a preferred embodiment, the canopy supports 108 are generally cylindrical, however, in alternate embodiments they may have a different geometrical cross-section than cylindrical. Further, in a most preferred embodiment the canopy supports 108 have a generally consistent diameter about their length, from the bottom end 140 thereof to the top end 142 thereof. Alternately, however, the bottom end 140 of the canopy support 108 may have a slight taper.

Referring again to FIGS. 3-5, in a preferred embodiment the receiving apertures 130 have a first entrance 144 at a top wall 122 of the wagon body 104, and a second entrance 146 at the interior wall, such as the interior side wall 118 of the wagon body 104. Further, in a preferred embodiment the first entrance 144 of the receiving apertures 130 is transverse to the second entrance 146 of the receiving aperture 130. As shown in FIG. 5, in one embodiment, there is no structure between the first entrance 144 and the second entrance 146 of the receiving apertures 130. Further, the receiving apertures 130 preferably have a plurality of ribs or protrusions 150 extending from an interior wall 148 of the receiving aperture 130 toward an interior of the receiving aperture 130. In one embodiment, different size protrusions 150 exist in the receiving apertures 130. For example, referring to the embodiment of FIG. 4A, there exists three smaller protrusions 150a and two larger protrusions 150b. However, a different number of protrusions may be provided. In one embodiment the larger protrusions 150b are provided adjacent the second entrance 146 at the interior side wall 118 of the wagon body 104, and the smaller protrusions 150a are provided distal the second entrance 146 of the receiving apertures 130. Having the larger protrusions 150b toward the second entrance 146 of the receiving apertures 130 provides additional support for the canopy supports 108 should a rider in the wagon 100 pull against the canopy supports 108. Preferably, the protrusions 150 have a radiused portion that contacts the canopy support 108. Additionally, in a preferred embodiment only, the protrusions 150 preferably do not have a tapered contact wall about the longitudinal axis of the receiving apertures 130. As such, under preferred tolerances, the protrusions 150 are generally able to have a contact area with the canopy supports 108 that forms a line contact. Notwithstanding the preferred constant or non-tapered contact surface, the smaller protrusions 150a may have a shape such as a teardrop shape extending from the first entrance 144 toward a bottom 152 of the receiving apertures 130. Additionally, in a preferred embodiment, the receiving apertures 130 do not comprise through holes and thus have a bottom wall at a bottom 152 of the receiving apertures 130. The protrusions 150 thus enable a pressure-fit holding of the canopy supports 108 to tightly support the canopy supports 108 in the receiving apertures 130 of the wagon body 104. Additional protrusions or ribs 150 may also be provided in the receiving apertures 130 to provide additional support for the canopy supports 108.

Figure 6:
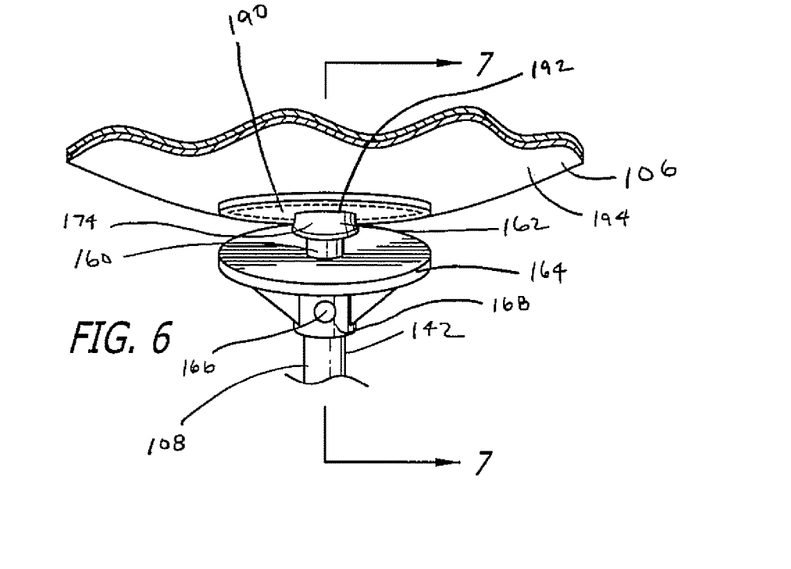
FIG. 6 is a partial perspective view of a connector of a canopy support being securely engaged to a receiver of the canopy of FIG. 1.
Figure 7:
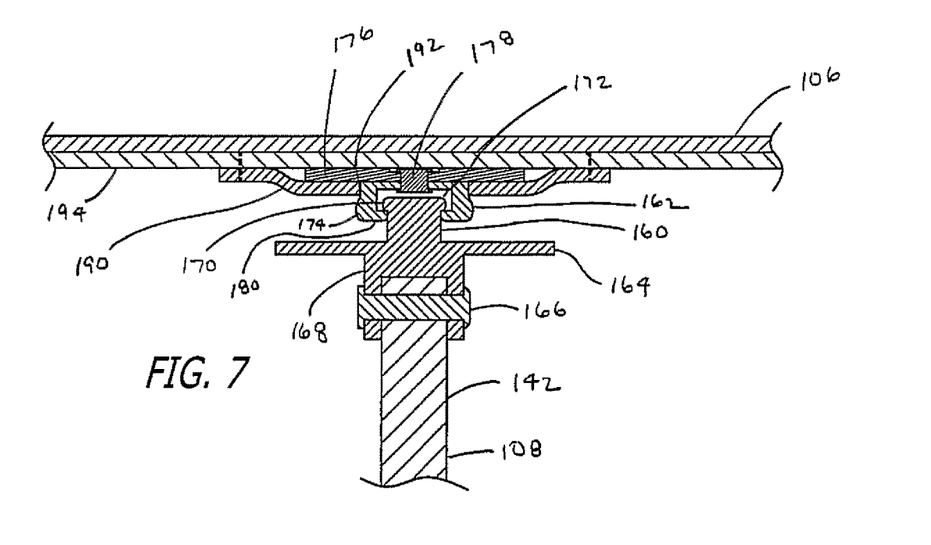
FIG. 7 is a cross-sectional view of a canopy support securely engaged to a receiver of the canopy of FIG. 1.
Figure 8:
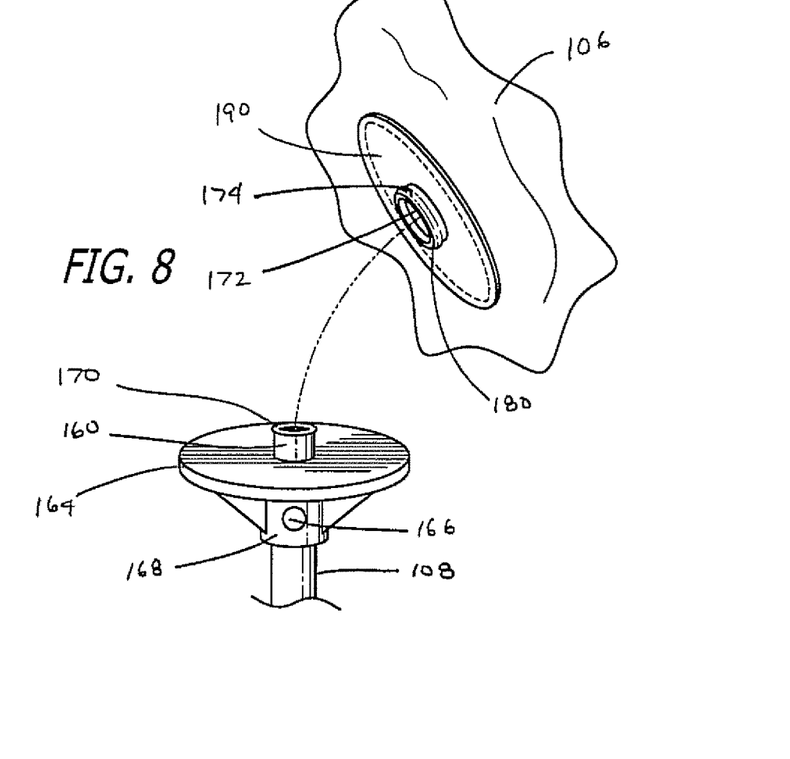
FIG. 8 is a perspective view of the receiver of the canopy of FIG. 1 prior to engagement with the connector of the canopy support.

As shown in FIGS. 6-8, in accordance with the present disclosure, each canopy support 108 preferably includes a connector 160 at the top end 142 of the canopy support 108, and which is configured to mate with a receiver 162 of the canopy 106. In a preferred embodiment, the connector 160 is a male snap and the receiver 162 is a female snap receiver so that when connected together, the connector 160 and receiver 162 become removably coupled in a press-fit/snapping manner.

In a preferred embodiment, a flange 164 extends radially outwardly from the connector 160. The flange 164 provides increased surface area for supporting the canopy 106. In one embodiment, the connector 160 and flange 164 are integral, however, they may be separate components that are fixed together. Additionally, in a preferred embodiment the connector 160 and flange 164 are an integral component made of plastic. The connector 160 and flange 164 are secured to the top end 142 of the canopy support 108, and a rivet 166 may be used to secure the connector 160 and flange 164 to the canopy support 108. In one embodiment, the connector 160 has an extension 168 that is sized and shaped to receive the top end 142 of the canopy support 108. An annular rib 170 is provided at a top end of the connector 160 to engage a depression 172 in the receiver 162 for creating the snap fit engagement between the connector 160 and receiver 162. While the connector 160 is shown as a male member received by a female receiver 162, the connector 160 may be a female member and the receiver may be a male member. Additionally, alternate connection methods may be utilized, such as a threading engagement, pressure fit engagement, friction engagement, etc.

As shown in FIG. 7, the mating receiver 162 is fixed in place on a bottom of the canopy 106. In one embodiment the receiver 162 includes a hollow cylindrical female receiver 174 and an extending flange 176. The cylindrical female receiver 174 may be integral with the extending flange 176, or they may be separate parts connected together. For example, as shown in FIG. 7, a rivet 178 is used to securely connect the female receiver 174 to the extending flange 176. In a preferred embodiment, the receiver 174 has a depression 172 that engages the circumferential flange 170 of the connector 160, as shown in FIG. 7, in a snap fit manner. The depression 172 is preferably created interior of an annular radially inwardly extending flange 180 that engages the connector 160. In accordance with the present disclosure, hollow cylindrical female receiver 174 is configured to accept therewithin, in a snapping manner performed by a user as shown in FIG. 8, connector 160 having circumferential flange 170 so as to removably secure the canopy 106 to the associated canopy support 108, as shown in FIG. 7. Additionally, the extending flange 176 of the snap receiver 162 rests on the associated flange 170 of snap connector 160 to provide further support to the canopy 106 on the canopy supports 108. As shown in FIGS. 1 and 2, each connector 160 on the canopy supports 108 has a corresponding mating receiver 162 in the canopy 106.

Figure 9:
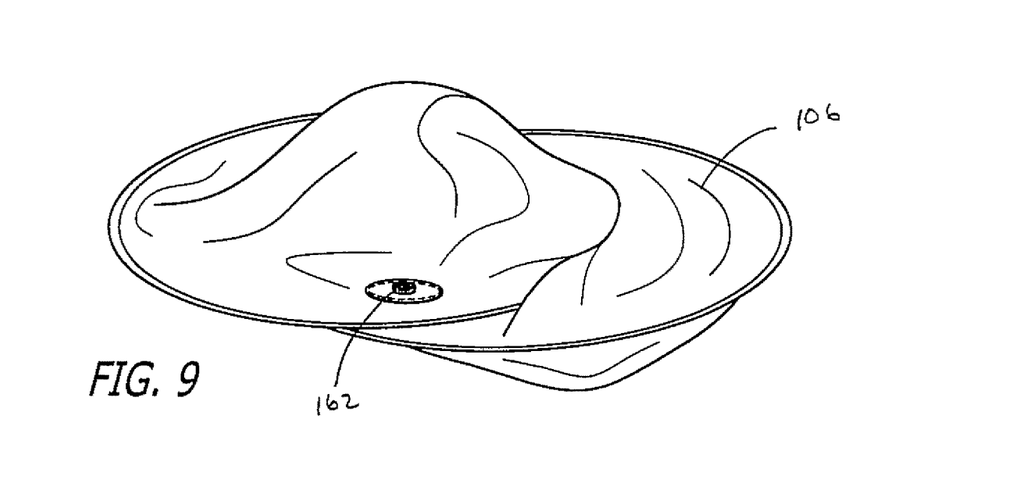
FIG. 9 is a perspective view of the canopy of FIG. 1 in a folded configuration.

As shown in FIGS. 8 and 9, the receiver 162 is fixed in place to the canopy 106. In one embodiment, a holder 190 is utilized to secure the receiver 162 in place on the canopy 106. Referring to FIGS. 6-8, in a preferred embodiment the holder 190 is preferably a generally planar member that has an opening 192 to allow the receiver 174 to extend through. The flange 176 of the receiver 162, however, is secured between the holder 190 and a bottom surface 194 of the canopy 106. In one embodiment, the holder 190 is fabric and is preferably sewn to the bottom surface 194 of the canopy 106 at a perimeter of the holder 190, and the flange 176 of the receiver 162 is therefore held between the bottom surface 194 of the canopy and the holder 190.

Referring now to FIGS. 1 and 2, canopy 106 includes an elongated top 200 configured to cover wagon body 104, and a side skirt 202 that extends peripherally downward and hangs from elongated top 200. In one embodiment, elongated top 200 includes two rounded opposing ends 204. Further, in this embodiment side skirt 202 has a length that changes peripherally around canopy 106. In one embodiment this changing length has a shortest size near a middle of canopy 106 and a longest size at opposing ends 204. Canopy 106 further includes a spring steel element (not shown), which is placed in a sleeve created at the joint between the elongated top 200 and the side skirt 202 of the canopy 106. The spring steel element provides structural stability to the canopy 106 and also allows for folding of the canopy 106 as described below and as shown in FIG. 9. As shown in FIG. 2, in a preferred embodiment canopy 106 has four snap receivers 162 connected thereto, each of which is positioned near one of its four corners, so as to be connected to the four canopy supports 108 extending from the receiving apertures 130 when canopy assembly 102 is secured to wagon body 104.

In accordance with the present disclosure, spring steel element, which is sewn into the sleeve between the elongated top 200 and the side skirt 202, is chosen so as to have a suitable strength that helps keep canopy 106 stretched out when in a unfolded arrangement, as shown in FIGS. 1 and 2. Due to the physical characteristics of spring steel element, canopy 106 can be easily folded for storage and unfolded for use by coupling to the four canopy supports 108. As shown in FIG. 9, a user can fold canopy 106 into a desirable arrangement by bending it lengthwise into a third of its length (i.e., substantially in two figure eights). During the folding process, as the left third portion of canopy 106 approaches the right third portion, the middle third portion will bend downwards to create a folded canopy 106 consisting of three section on top of one another. Alternatively, canopy 106 can be folded in any other desirable arrangement, such as a single figure eight configuration, for example.

In accordance with the present disclosure, canopy 106 may be fabricated with materials that protect children seating in wagon body 104 for the sun. Moreover, these materials are lightweight, strong, water and wind resistant, so as to provide protection from wind and rain.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A canopy assembly for a ride-on vehicle, comprising:
a canopy having a top surface, a bottom surface, and a plurality of receivers extending from the bottom surface of the canopy, wherein the receivers comprise a female receiver and a flange extending radially outwardly therefrom; and,
a plurality of separate canopy supports, each of the plurality of canopy supports having a top end and a bottom end, wherein each of the plurality of canopy supports has a connector at the top end thereof, the connectors being configured to be individually removably secured to the receivers of the canopy, wherein each of the plurality of connectors has a supporting flange extending radially outwardly from the connector to support a portion of the canopy, and wherein each of the bottom ends of the canopy supports are configured to be individually connected to the ride-on vehicle.

2. The canopy assembly of claim 1, wherein the connectors comprise a male connector that is received within the female receiver.

3. The canopy assembly of claim 2, further comprising an annular rib on an exterior surface of the male connector to enable the male connector to engage the female receiver in a snap fit orientation.

4. The canopy assembly of claim 1, further comprising a plurality of holders secured to the bottom surface of the canopy, each of the holders securing a different receiver to the canopy.

5. The canopy assembly of claim 4, wherein each holder has an aperture, and wherein the respective receiver extends partially through the aperture in the holder.

6. The canopy assembly of claim 1, wherein the bottom end of each of the plurality of canopy supports is configured to securely fit within a respective receiving aperture formed in the ride-on vehicle.

7. The canopy assembly of claim 6, wherein the receiving apertures have an inner surface with a plurality of ribs extending inwardly therefrom.

8. The canopy assembly of claim 6, wherein the receiving apertures have a first entrance and a second entrance transverse to the first entrance.

9. The canopy assembly of claim 6, wherein each of the canopy supports comprises a separate elongated pole member.

10. The canopy assembly of claim 1, wherein the canopy has a planar portion, a skirt portion extending from the planar portion, and a spring steel element extending about the periphery of the planar portion adjacent a joint between the planar portion and the skirt portion.

11. A canopy assembly for a ride-on vehicle, comprising:
a canopy having a top surface and a bottom surface;
a plurality of holders secured to the bottom surface of the canopy;
a plurality of receivers, each of the receivers having a flange extending radially outwardly, each holder securing one of the receivers to the canopy via the flange of the receiver; and,
a plurality of separate canopy supports, wherein each of the plurality of canopy supports has a connector at a top end thereof, the connectors being configured to be individually removably secured to the receivers of the canopy, each connector having a supporting flange extending radially outwardly from the connector to support a portion of the receiver.

12. The canopy assembly of claim 11, wherein each of the plurality of holders has an aperture therethrough, and wherein a portion of one of the respective receivers extends through the aperture.

13. The canopy assembly of claim 11, wherein the flange of the receiver is secured to the canopy between the holder and the bottom surface of the canopy.

14. A canopy assembly for a ride-on vehicle, comprising:
a canopy having a top surface, a bottom surface, and a plurality of receivers extending from the bottom surface of the canopy; and,
a plurality of separate canopy supports, wherein each of the plurality of canopy supports has a connector at a top end thereof, the connectors being configured to be individually removably secured to the receivers of the canopy, wherein each of the plurality of canopy supports includes a bottom end that is configured to securely fit within a respective receiving aperture formed in the ride-on vehicle, the receiving apertures having an inner surface with a plurality of ribs extending inwardly therefrom to support the canopy support, wherein the receiving apertures have a first entrance and a second entrance transverse to the first entrance, wherein the first entrance is adjacent a top surface of the ride-on vehicle, and wherein the second entrance is adjacent a sidewall of the ride-on vehicle and extends to the top surface of the ride-on vehicle.

15. The canopy assembly of claim 14, wherein there is no ride-on vehicle structure between the first entrance and the second entrance.

16. The canopy assembly of claim 14, wherein the plurality of ribs include a plurality of first ribs and a plurality of second ribs, the second ribs being larger than the first ribs, and wherein the plurality of second ribs are closer to the second entrance than the plurality of first ribs.

17. The canopy assembly of claim 14, wherein each connector has a supporting flange extending radially outwardly from the connector to support a portion of the receiver.

* * * * *